United States Patent [19]

Busso et al.

[11] Patent Number: 4,790,592
[45] Date of Patent: Dec. 13, 1988

[54] AUTOMOBILE SEAT HAVING RETRACTABLE PROTECTIVE COVERING

[75] Inventors: Fiorenzo Busso, Ann Arbor, Mich.; Vincent Russo, Cary, N.C.

[73] Assignee: ITT Corporation, New York, N.Y.

[21] Appl. No.: 48,056

[22] Filed: May 11, 1987

[51] Int. Cl.⁴ .............................................. A47C 31/11
[52] U.S. Cl. ................. 297/184; 150/52 K; 297/218; 297/229
[58] Field of Search ............... 297/184, 218, 219, 229, 297/440; 150/52 K, 52 M; 296/136

[56] References Cited

U.S. PATENT DOCUMENTS

| 4,118,066 | 10/1978 | Ricke | 297/184 |
|---|---|---|---|
| 4,320,922 | 3/1982 | Meritis | 297/184 X |
| 4,458,738 | 7/1984 | Wilson | 297/219 X |
| 4,668,011 | 5/1987 | Fister, Jr. | 297/218 |

FOREIGN PATENT DOCUMENTS

| 14626 | of 1891 | United Kingdom | 297/184 |
|---|---|---|---|
| 16641 | of 1899 | United Kingdom | 297/184 |
| 21946 | of 1903 | United Kingdom | 297/184 |
| 389958 | 3/1933 | United Kingdom | 297/184 |

Primary Examiner—Kenneth J. Dorner
Assistant Examiner—Peter R. Brown
Attorney, Agent, or Firm—James B. Raden

[57] ABSTRACT

An automobile seat having an extendable-retractable protective covering for protecting the seat against exposure to the sun and soil is disclosed. The seat includes a retractable-extendable rolled covering mounted at the front of the seat below the seat bottom and behind a seat trim piece. The covering includes a combination retention member and grasp engaged to the trim piece to hold the shade in its stored position and providing for finger engagement to extend the covering over the seat.

3 Claims, 3 Drawing Sheets

AUTOMOBILE SEAT HAVING RETRACTABLE PROTECTIVE COVERING

BACKGROUND OF THE INVENTION

This invention relates to automobile seats and more particularly to an automobile seat having a retractable protective covering.

Automobile seats, and in particular seats having vinyl, leather or other non-fabric coverings, when exposed to the sun for long periods of time can become extremely hot even to the point of burning an occupant who sits on the seat after such exposure. Also, certain seat covering materials when exposed to high temperatures caused by exposure to the sun can permanently change shape. Further, the ultraviolet rays of the sun can cause certain coverings, including fabrics, to permanently fade and change color.

Also, parcels and packages placed on the seat, as well as the clothing of persons, can be dirty or soiled which can be transferred to the seat resulting in soil and stain marks.

Heretofore, seat protection has been provided through special fabrics and the application of special soil and stain resistant materials. Some of these materials also provide some protection against fading due to ultraviolet rays of the sun. For the most part, however, the best protection against the effects of the sun is afforded by physically covering the seat. Protection against stain and soil marks by covering the seat, heretofore, has been accomplished by using any readily available item, such as a towel, rag, package or other article within reach or carried within the vehicle.

SUMMARY OF THE INVENTION

It is, therefore, the object of the invention to provide protection for an automobile seat cushion against the adverse effects of the sun as well as against dirt and other stains.

According to the invention there is provided a protective covering in the form of a shade-like member mounted to the lower front part of the seat frame.

According to an important feature of the invention, there is provided a seat for an automobile including a covering that is extendable for positioning over the seat bottom cushion and which is retractable into a storage container for future use.

Another feature of the invention provides for the device to be pulled out from below the seat for positioning over the seat bottom cushion.

According to another important feature of the invention, the free end of the covering is retained to the seat proximate the headrest and lies against both the seat bottom cushion and back cushion.

Another feature of the invention provides for the covering to be positioned over the seat bottom cushion and seat back cushion in tent-like fashion.

Another feature of the invention provides for the covering to be made from a highly stain and soil resistant material.

A still further important feature of the invention provides for the protective covering to be made from a material which is substantially opaque to the passage of ultraviolet radiation.

BRIEF DESCRIPTION OF THE DRAWINGS

The invention will be better understood after reading the following detailed description of the preferred embodiment in conjunction with the drawings in which.

DETAILED DESCRIPTION OF THE PREFERRED EMBODIMENT

Figure 1:
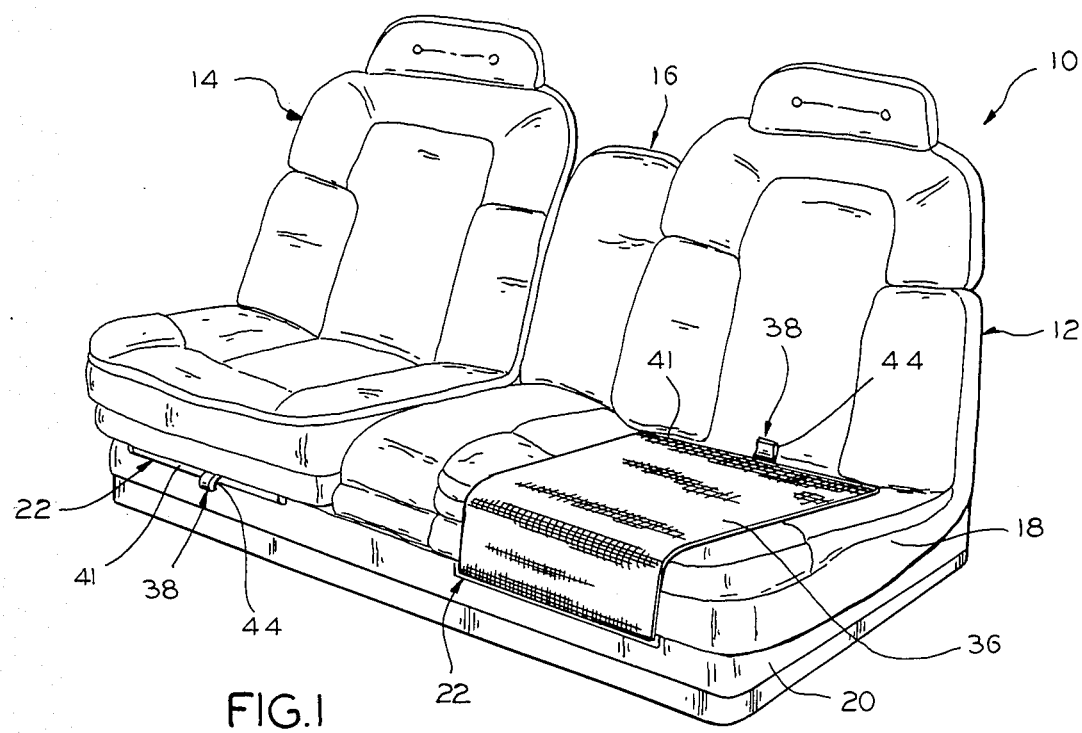
FIG. 1 is a pictorial view of a front seat arrangement for an automobile including the protective covering according to the invention.

Shown in FIG. 1 is a vehicle front seat arrangement 10. The arrangement shown in a split seat including a drivers seat 12 and a passenger seat 14 separated by an armrest 16. Other seating arrangements are applicable to the invention described herein and the invention is not to be considered limited to the type of seat shown. Rear seats of a vehicle are also applicable to be provided with the protective device.

The seat 10 includes a typical seat bottom cushion 18 and a trim piece 20 around the lower front and side portions of the seat bottom cushion 18. A protective covering device 22 described more fully below, is mounted transversely across the front of the seat frame below the seat bottom cushion 18 and behind the trim piece 20. As shown in FIG. 1, the protective covering is extendable for positioning over the exterior of the seat bottom cushion and retractable into a stored position, as shown at the passengers seat in FIG. 1, for later use.

Figure 2:
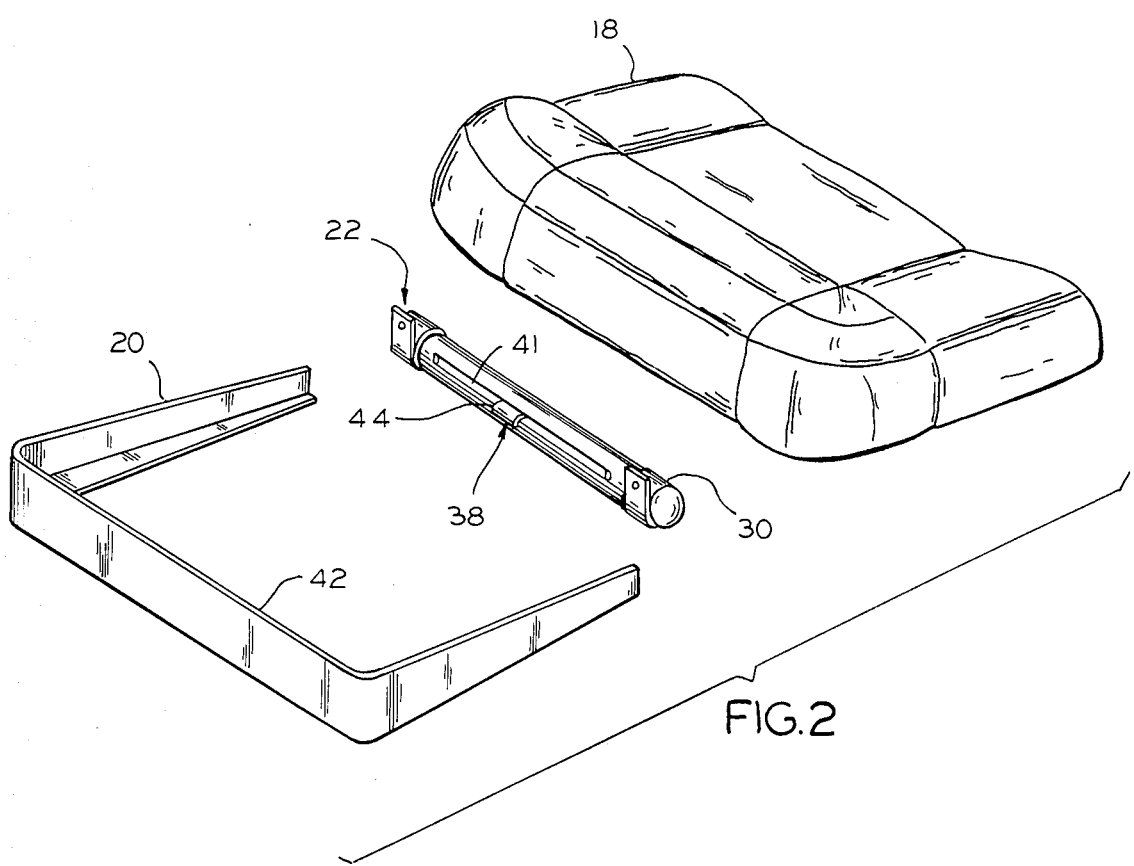
FIG. 2 is an exploded pictorial view of the bottom cushion of the seat according to FIG. 1 showing the position of the protective device according to the invention.
Figures 3, 4:
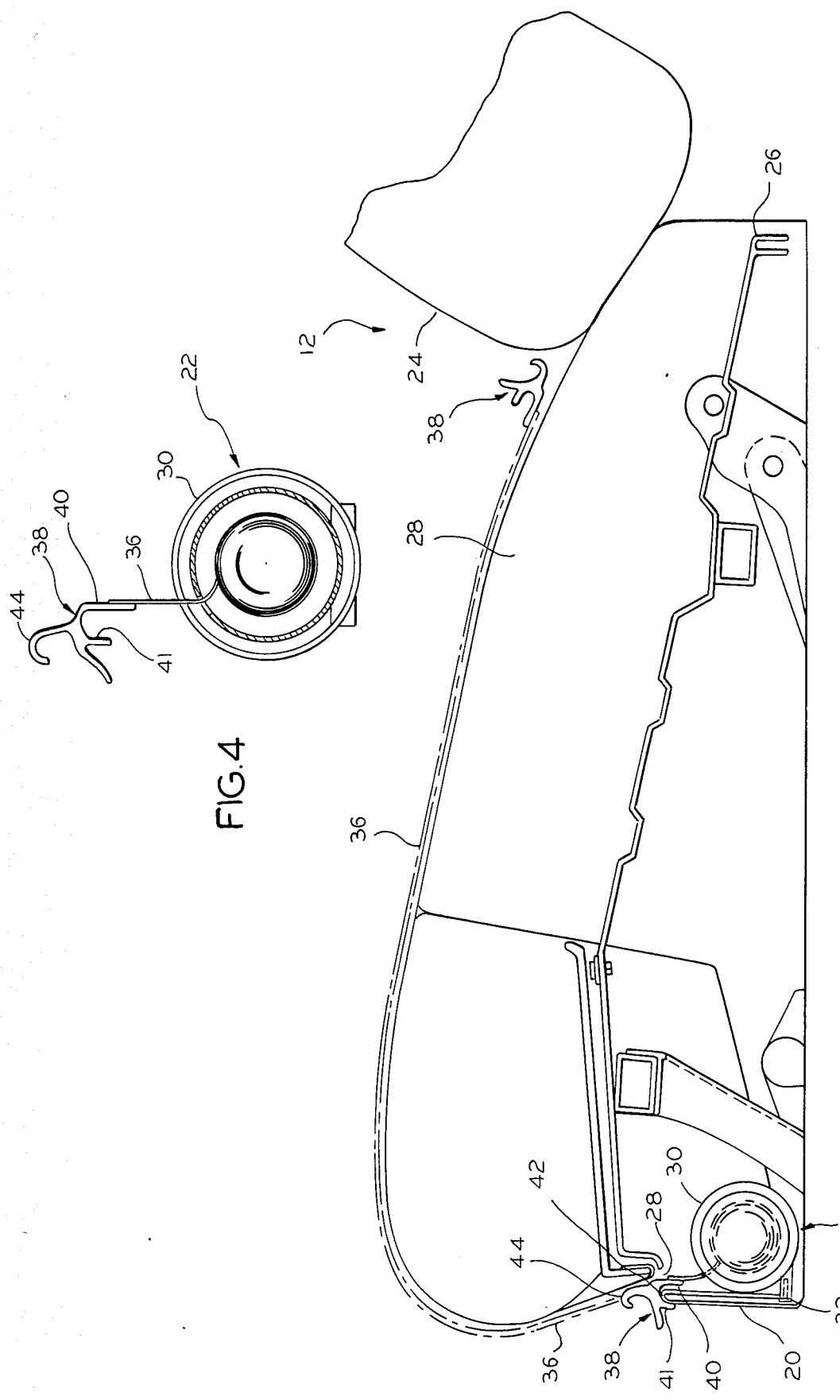
FIG. 3 is a cross-sectional view of the bottom portion of the seat of FIGS. 1 and 2 including the protective covering device according to the invention showing details of construction.
FIG. 4 is a vertical cross-sectional view of the protective covering device shown in the retracted position.

FIG. 2 shows the mounting relationship of the protective covering device to the other seat components. Only the driver's seat 12 portion will be described since the construction of the passenger's seat 14 side is the same. Referring to FIG. 3, the seat 12 includes a back frame and cushion assembly 24, only a portion of which is shown, either immovably or permanently affixed to a seat bottom frame 26. The seat bottom frame 26 is mounted on a track for fore and aft movement. The seat bottom frame 26 is also provided with the appropriate padded cushion 18.

As stated, the seat is provided with a trim piece 20 fastened to the seat bottom frame in a manner such that a transverse gap 28 is maintained between the top of the trim piece 20 and the seat bottom cushion 18.

The protective covering device 22 is an elongated tube-like housing 30 mounted to the seat frame 26, for example for fasteners 32. A flexible protective fabric or fabric like member 36 is rolled internally within the housing 30, as shown in FIG. 4, so as to be extendable from the housing and automatically retained at any position desired, for example, at any position covering the seat cushion, as shown in FIGS. 1 and 3. The protective covering 36 is mounted within the housing 30 in a manner similarly that a window shade might be mounted for extension, retention and retractability. The covering 36 extends through the gap 28 and is provided with a combination grasp and retention member 38 at its free end. The member 38 is, for example, made of plastic and has the covering glued, riveted or otherwise affixed to a depending flange 40 which extends below and behind the trim piece 20. The retention portion 41 of the member 38 is a generally inverted U-shape and extends along the entire width of the covering with the top edge 42 of the trim piece 20 received in the U-shaped retention portion 41. The member 38 is also provided with a grasp 44 in the form of an inverted J-shaped portion at the top of the member. The J-shape provides for finger engagement of the member so that it may be pulled upwardly to extend the covering. Preferably, the covering is biased into the retracted position by an internal spring arrangement providing for engagement of the U-shaped retention portion 41 around and against the trim piece edge 42. As shown in FIG. 1, the grasp portion 44 of the member 38 only need be of sufficient width to allow the operator to grab hold of it and need not extend across the entire width of the seat as does the U-shaped retention portion 41.

Figure 5:
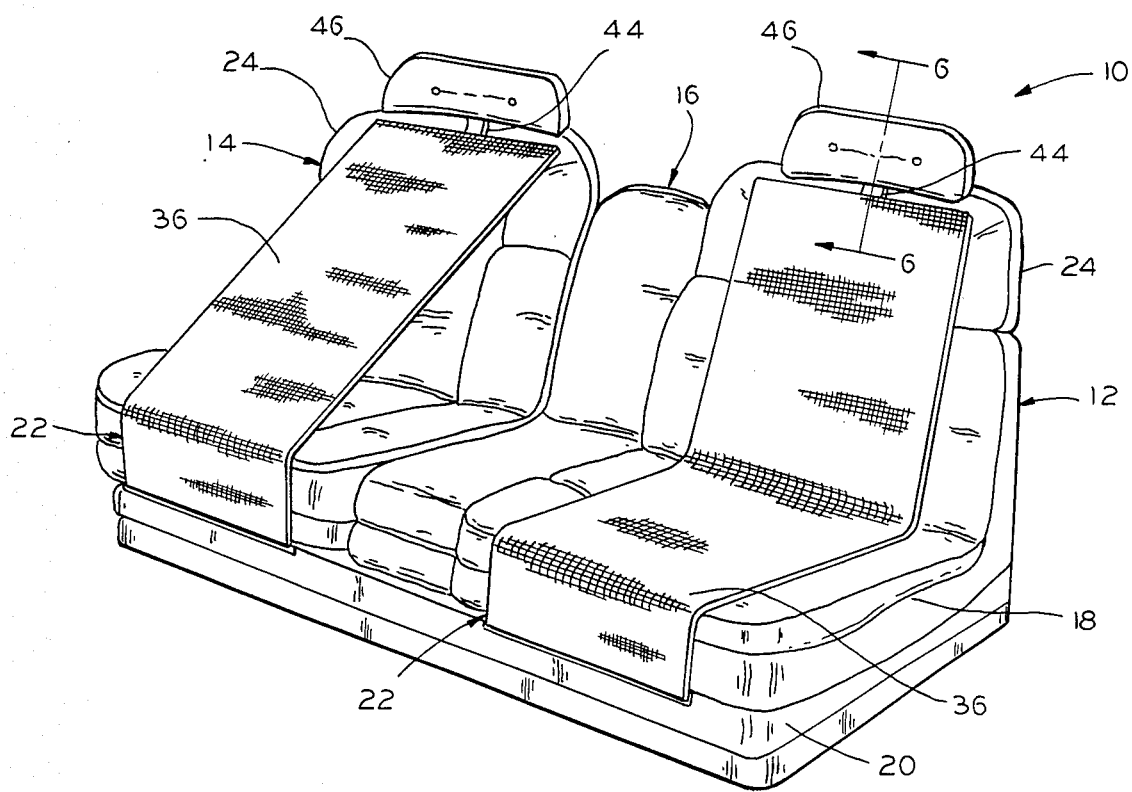
FIG. 5 is a pictorial view of a front seat arrangement for an automobile showing the protective covering positioned alternatively against the seat bottom and back cushion and over the seat in tent-like fashion.
Figure 6:
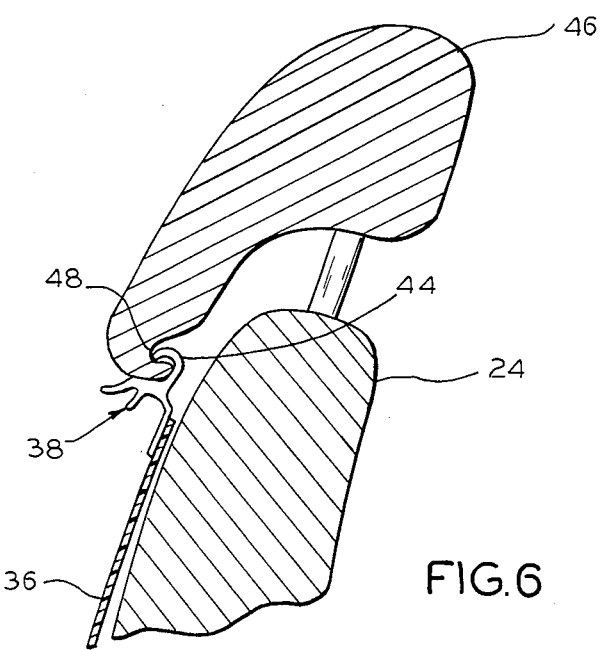
FIG. 6 is a partial cross-sectional view along the line 6—6 in FIG. 5 showing details of a grasp for retaining the covering to the headrest at the top of the seatback cushion.

Referring to FIGS. 5 and 6, the grasp 44 also functions as a retention member for retaining the free end of the covering 36 at the top of the seat back 24. For example, the grasp 44 is received in an indentation 48 in the back side of the headrest 46, as shown in FIG. 6. Other means for retaining the covering can readily be devised. Whatever means is utilized, it must provide for easy releasable retention of the free end of the covering at a location proximate the top of the seat back.

Retention of the covering proximate the top of the seat back provides for holding the covering so as to cover both the seat bottom and seat back. Preferrably, the covering 36 is retained over the seat in tent-like fashion, as shown at the passenger seat 14 in FIG. 5, due to the retraction bias placed on the covering. Alternatively, the covering, due to its flexible nature, can be retained lying directly against the bottom and back cushions, as shown at the drivers seat 12 in FIG. 5. The tent-like structure provides for fast positioning of the covering over the entire seat and provides space for articles to be placed on the seat which are also protected. The flexible positioning of the cover directly against the seat conforms to the seat contour and provides protection to the entire seat when occupied by, for example, a person.

The material for the protective covering should be flexible so that it will roll freely and be positionable around the front contour of the seat cushion 18 and, of course, should be either naturally highly soil resistant or treatable with any well known soil resistant substance. Also, it is preferable that the material be highly opaque to ultraviolet light.

Having described the preferred embodiment of the invention, those skilled in the art having the benefit of that description can readily devise other embodiments and modifications and those other embodiments and modifications are to be considered to be within the scope of the appended claims.

What is claimed is:

1. An automobile seat, comprising:
    a frame including a back cushion and a seat cushion;
    a trim piece extending around a front end of said seat cushion, said trim piece being adjacent the bottom of said frame and extending upwardly therefrom to define a transverse opening between the top edge of said trim piece and said front end of said seat cushion;
    protective covering means mounted to said frame below said seat cushion and behind said trim piece, said protective covering means including a flexible covering extending through said opening for movement between a retracted position and an extended position wherein said flexible covering extends over an external surface of said seat cushion;
    a free end of said flexible covering including retention means engaging said trim piece in said retracted position, said retention means including a grasp for extending said flexible covering over said external surface of said seat cushion, wherein said retention means includes a member affixed to said free end of said flexible covering, said member having an inverted U-shaped configuration for engaging said top edge of said trim piece in said retracted position of said flexible covering.

2. An automobile seat in accordance with claim 1 wherein said grasp is integrally formed with said member and has an inverted J-shaped configuration located above said inverted U-shaped configuration in said retracted position of said flexible covering.

3. An automobile seat in accordance with claim 2 wherein said protective covering means includes an elongated tube-like housing and wherein said flexible covering is in rolled relationship with said housing.

* * * * *